May 14, 1963 E. BEYER 3,089,746

FEED CONTROL APPARATUS FOR RECORD SHEETS

Original Filed July 21, 1953 3 Sheets-Sheet 1

INVENTOR
EUGEN BEYER, DECEASED
BY MARTHA BEYER, NEE FEIST,
FRED BEYER, DIANA BEYER
AND CHRISTA BEYER, HEIRS

Michael S. Striker
ATTORNEY

May 14, 1963 E. BEYER 3,089,746

FEED CONTROL APPARATUS FOR RECORD SHEETS

Original Filed July 21, 1953 3 Sheets-Sheet 2

INVENTOR
EUGEN BEYER, DECEASED.
BY MARTHA BEYER, NEE FEIST,
FRED BEYER, DIANA BEYER,
AND CHRISTA BEYER, HEIRS

BY
Michael S. Striker
ATTORNEY

FEED CONTROL APPARATUS FOR RECORD SHEETS

Original Filed July 21, 1953 3 Sheets-Sheet 3

INVENTOR
EUGEN BEYER, DECEASED
BY MARTHA BEYER, NEE FEIST, FRED BEYER, DIANA BEYER AND CHRISTA BEYER, HEIRS

Michael S. Striker
ATTORNEY 3,089,746

FEED CONTROL APPARATUS FOR RECORD SHEETS

Eugen Beyer, deceased, late of Heilbronn (Neckar), Germany, by Martha Beyer, nee Feist, Fred R. Beyer, Diana Beyer, and Christa Beyer, heirs, all of Heilbronn (Neckar), Germany; said Martha Beyer assignor to said Fred R. Beyer, Diana Beyer, and Christa Beyer Original application July 21, 1953, Ser. No. 369,384, now Patent No. 2,946,593, dated July 26, 1960. Divided and this application June 30, 1960, Ser. No. 40,104
Claims priority, application Germany July 21, 1952
4 Claims. (Cl. 346—138)

The present invention relates to a feed control apparatus for record sheets which are fed into a recording and reproducing machine. More particularly, the present invention relates to an arrangement for preventing the feeding of a record sheet into the machine while another record sheet is being scanned during a recording or playback operation.

The present application is a divisional application of copending application for magnetic recording and reproducing equipment, Serial No. 369,384 filed July 21, 1953, now U.S. Patent No. 2,946,593, and claiming priority based on an application filed in Germany on July 21, 1952.

It is one object of the present invention to provide in a recording and reproducing machine, a feed control apparatus preventing the feeding of a record sheet while another record sheet is being scanned in the machine.

Another object of the present invention is to provide sensing means for determining whether or not a record sheet is being scanned in the machine, and to provide means for preventing the feeding of a record sheet when the sensing means determine the presence of a record sheet in the machine.

With these objects in view, the present invention relates to a feed control apparatus which comprises a rotary member for transporting a record sheet wrapped around the peripheral surface thereof; feeding means for successively feeding record sheets to the rotary member and including a guide portion adjacent the rotary member; stop means movable between an inoperative position permitting passage of a record sheet to the rotary member and a blocking position blocking the passage of record sheets; and sensing means tending to move to a first position engaging the rotary member, and assuming a second position when engaging a transported record sheet located on the peripheral surface of the rotary member. The sensing means is operatively connected to the stop means to hold the same in the inoperative position while the sensing means engages the rotary member, and to hold the stop means in the blocking position while the sensing means engages a record sheet transported by the rotary member. In this manner, feeding of record sheets by the feeding means to the rotary member is prevented while a portion of a record sheet transported by the rotary member is located in the region of the sensing means.

Preferably, the peripheral surface of the rotary member has an annular groove which is covered by a record sheet transported by the rotary member. The sensing means is located opposite the groove, and when there is no record sheet transported, the sensing means slides in the annular groove, whereas a transported record sheet engages the sensing means and holds the same in another position in which the stop means block the feeding of a new record sheet.

In the preferred embodiment of the present invention, the sensing and stop means are combined in an angular lever having a sensing arm and a stop arm which is movable to a blocking position located in a guideway through which copy sheets are transported to the rotary member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
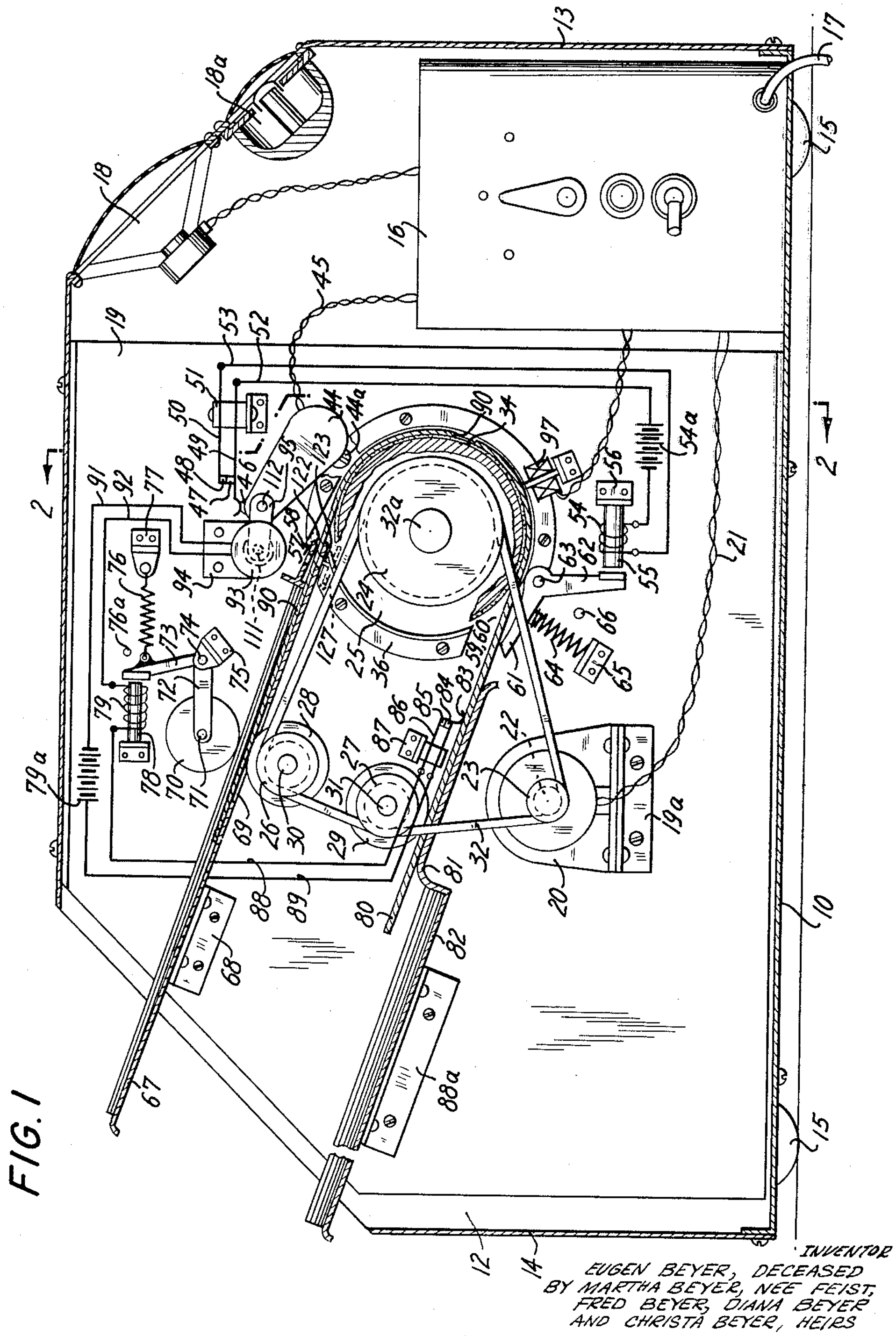
FIG. 1 is a diagrammatic sectional view of a recording and reproducing machine incorporating the present invention.

Referring now to the drawings, a casing includes a bottom wall 10, side walls 11 and 12, a front wall 13 and a rear wall 14, and is supported on rubber feet 15. The front wall of the casing carries the electrical equipment 16 which is connected to a source of electric power by a cord 17. Front wall 13 also carries a microphone 18*a* and a speaker 18.

Figure 2:
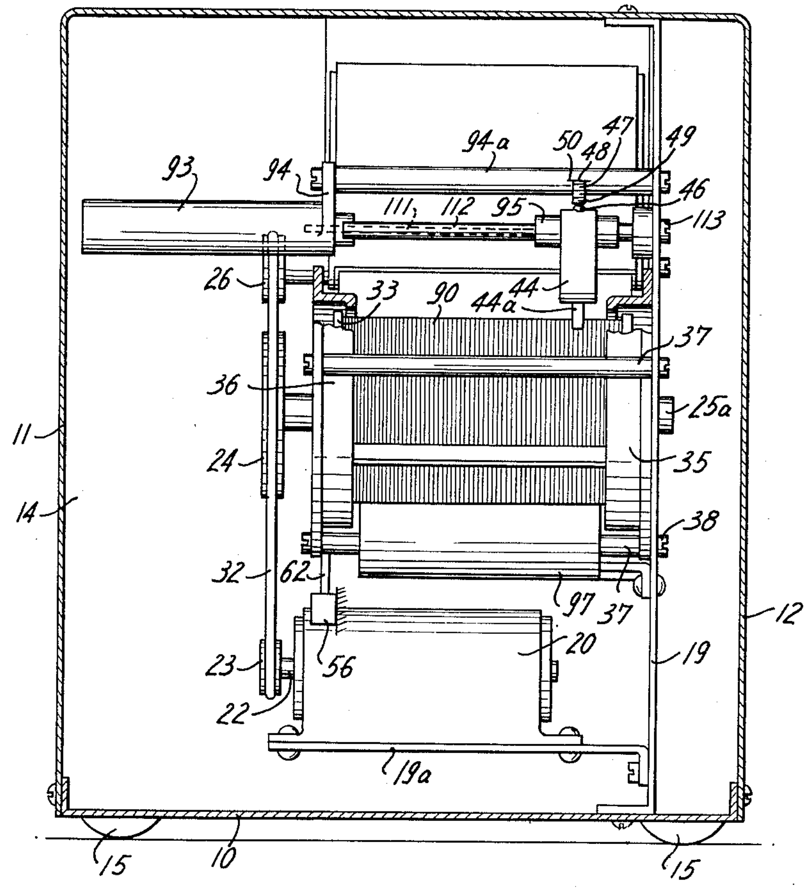
FIG. 2 is a section taken on line 2—2 of FIG. 1.

An electric motor 20 has a cord 21 and is mounted on a bracket 19*a* which is secured to an intermediate wall 19, as best seen in FIG. 2. Shaft 22 of motor 20 carries a pulley 23 which drives through a belt 32 three pulleys 24, 26 and 27. Pulley 24 is fixed to a rotary drum member 25, pulley 26 is secured to a transporting roller 28, and pulley 27 is secured to a transporting roller 29. Shafts 30 and 31 are mounted on the casing and turnably support transporting rollers 28 and 29.

The rotary drum member 25 and pulley 24 are turnably mounted on a shaft 32*a* which is secured to wall 19 at 25*a* and supports a pair of end flanges 33, as best seen in FIG. 2. Drum member 25 is made of a non-magnetic material, and has a resilient surface layer 34. A pair of guide rings 35 and 36 are located at opposite ends of member 25, and are held together and mounted on wall 19 by rods 37 and screws 38.

A rod 112 supports a scanning head 44 for turning movement and also for movement along the length of rod 112 in axial direction of the rotary member 25, 34. Rod 112 is secured at 113 to the supporting wall 19. Conductors 45 connect the scanning head 44 with the electrical equipment 16. Scanning head 44 has a scanning part 44*a* and a projection 46 which operates a pair of contacts 47 and 48 of a pair of contact springs 49 and 50 which are mounted on an insulating support 51. Conductors 52 and 53 are connected to the contact springs 49 and 50 and connect the same to a coil 54 wound on a magnetic core 55 which is secured to a support 56. A battery 54*a* is connected into the circuit of the electromagnetic means 54, 55.

Guide rings 35 and 36 have inlet openings 57 and 58 through which record sheets may successively pass into the space between the rings and the peripheral surface of rotary member 25, 34. Outlet openings 59 and 60 are provided in rings 35 and 36 through which record sheets are discharged and ejected.

The outlet opening of ring 35 is normally closed by an arm 61 of a closure means 61, 62 which is turnably mounted on a pin 63 on ring 35. Arm 62 is made of iron and constitutes an armature for the electromagnetic means 54, 55 so that the closure means 61, 62 is turned about pin 63 when the winding 54 is energized by closed contact points 47, 48. A spring 64 abuts on a support 65 and urges closure means 61, 62 in a position closing outlet opening 59 in which a stop 66 engages arm 62.

A stack of record sheets is located on a first support 67 which has a cutout 69 into which transporting roller 28 projects so as to engage the lowest record sheet 90 of the stack. A pair of arms 72 is turnably mounted on a pin 74 of a supporting bracket 75, and supports a pressure roller means 70 turnably about a shaft 71. Another arm 73 is secured to shaft 74 and turns with arm 72. Arm 73 is connected to the spring 76 which is secured to the stationary supporting bracket 77 and tends to turn the bell-crank lever 72, 73 into a position in which the transporting roller 70 is raised from the stack of sheets. An electromagnetic means including a winding 79 and a core 78 cooperates with arm 73 to attract arm 73 when winding 79 is energized, whereby pressure roller means 70 is moved to a transporting position pressing the stack of record sheets, and more particularly the lowest record sheet 90, against transporting roller 28, so that record sheet 90 is fed through the inlet openings 57, 58 into the space between the rotary member 25, 34, and the guide rings. A battery 79*a* is connected into the circuit of winding 79 which also includes a pair of contact springs 86 mounted on an insulating member 87. Contact points 85, 84 are secured to contact springs 86 which tend to move apart into a position in which contact points 84, 85 are separated.

A second support 81 receives record sheets discharged by rotary member 25, 34 through the outlet openings 59 and 60. When a record sheet 80 passes over support 81, it engages an extension 83 of the lower contact spring 86 and effects closing of contact points 84, 85. When there is no record sheet location on support 81, extension 83 moves toward support 81, and contact points 84, 85 open. When a record sheet 80 has been transported by the action of rotary member 25 to a position in which its leading portion engages transporting roller 29, record sheet 80 is further transported by transporting roller 29 to a receptacle 82 mounted on a supporting bracket 88*a*.

As best seen in FIG. 2, an electromagnetic means including a coil 93 and a movable armature 111 is supported on a rod 94*a* which is secured to wall 19 by a bracket 94. The movable armature is connected to the scanning head 44 by a link 95. As shown in FIG. 1, coil 93 is connected by a conductor 91 to the battery 79*a*, and by a conductor 92 to one end of winding 79. Consequently, coil 94 is energized simultaneously with winding 79 when contact points 84, 85 engage each other when sensing member 83 senses a discharged record sheet 80 on support 81.

An erasing head 97 is provided in the region of the rotary member 25 to erase recordings on the record sheets in a conventional manner.

Motor 20 drives rotary drum member 25 with resilient sleeve 34 and transporting rollers 28 and 29 at a uniform speed. A record sheet located in the space between rotary member 25, 34 and guide rings 35, 36 will be transported by the drum.

At the beginning of the operation, the scanning head 44 will be on the left of the rotary member as viewed in FIG. 2 and will ride in helical tracks of the record sheet while the same performs as many revolutions with transporting member 25 as are required for transporting the head to the terminal position on the right of rotary member 25, as viewed in FIG. 2. When the head 44 has scanned the entire sheet, projection 46 closes contact points 47 and 48, and completes the circuit of winding 54 of the electromagnetic means 54, 55, 62 so that arm 61 will move to a position opening the outlet opening 59. The leading edge of the record sheet, which slides on surface 40, will pass through opening 59 and be guided by arm 61 onto support 81. When the leading edge of record sheet 80 engages sensing member 83, switch 84, 85, 86 closes so that the circuit of electromagnetic windings 79 and 93 is completed.

The energized winding 79 attracts arm 73 and moves transporting roller 70 to its transporting position in which the stack of sheets on support 67 is pressed against transporting roller 28 so that the lowest record sheet is transported through the inlet openings 57, 58 to a position engaging the surface of the rotary member 25, 34, so that the new record sheet is transported wrapped about rotary member 25, 34. The sensing means 83 to 86 is positioned in such a manner that the new record sheet is fed in a position in which its leading edge is spaced a very short circumferential distance from the trailing edge of the discharge record sheet 80.

When switch 84 to 86 closes, coil 93 is energized, and the armature 111 moves scanning head 44 to the left end position as viewed in FIG. 2. This operation is timed in such a manner that portion 44*a* of scanning head 44 passes through the gap between the newly fed record sheet and the discharged record sheet.

At the beginning of such movement of the scanning head 44, contacts 47 and 48 are separated, since projection 46 released contact spring 49. The circuit of winding 54 is interrupted, and spring 64 moves arm 61 to a position closing the outlet opening 59 in the moment in which the trailing edge of record sheet 80 has passed through outlet opening 59. The leading edge of the newly fed record sheet reaches the outlet opening 59 when the same is already closed, so that the newly fed record sheet is transported by rotary member 25, 34 in the space between the peripheral surface thereof and the guide surfaces 40 and 41, while the record sheet is being scanned by scanning head 44, 44*a*.

The operation of the scanning head is not an object of the present invention, and has been described for a better understanding of the apparatus of the present invention.

Figure 3:
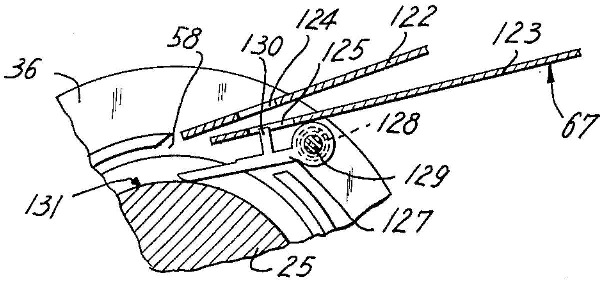
FIG. 3 is a fragmentary cross-sectional view illustrating a feed control device according to the present invention.
Figure 4:
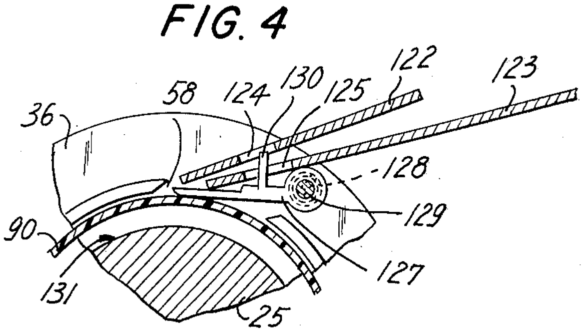
FIG. 4 is a fragmentary cross-sectional view illustrating the feed control device of FIG. 3 in another operational position.
Figure 5:
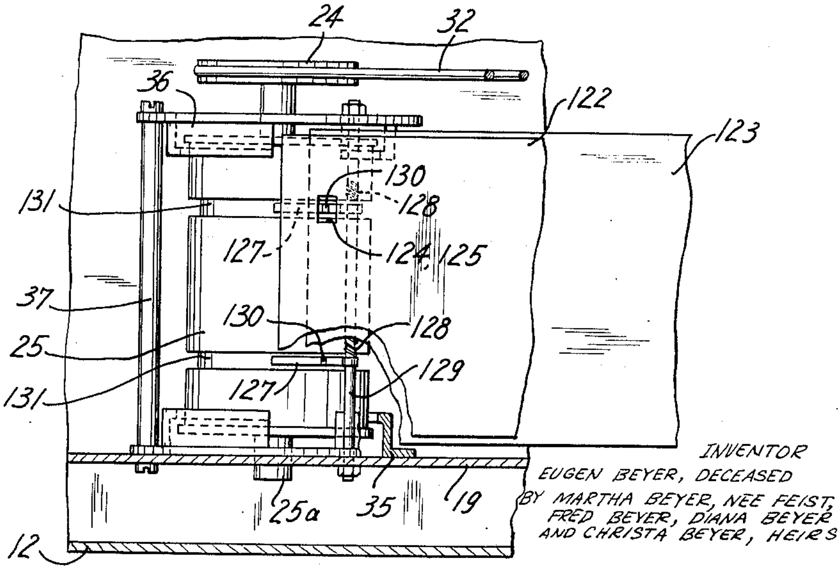
FIG. 5 is a fragmentary plan view according to FIG. 3 on a reduced scale.

As best seen in FIGS. 3, 4 and 5, the support 67 terminates in a guide portion which includes an upper guide wall 122 and a lower guide wall 123 which form a guideway for a fed record sheet. Wall 122 has a cutout 124 and wall 123 has a cutout 125 located opposite cutout 124. The rotary member 25 has one or several annular grooves 131 in the peripheral surface thereof each of which is located opposite a combined sensing and stop element which includes a sensing means in the form of a lever 127, and a stop means in the form of a lever arm 130. The angular levers 127, 130 are turnably mounted on a shaft 129 which is secured to rings 35 and 36. A torsion coil spring 128 is connected to each lever 127 and mounted on shaft 129 so as to urge angular lever 127, 130 into a position engaging the peripheral surface of rotary member 25, and more particularly the bottom of the annular groove 131. When no copy sheet is wrapped about rotary drum member 25, the sensing lever arm 127 is located in the groove 131, as shown in FIG. 3, and the stop lever arm is in a retracted position located outside of the guideway defined by guide walls 122 and 123. Consequently, a record sheet fed through the guideway can enter through the inlet openings 57, 58 so as to be engaged by the peripheral surface of the rotary drum member 25 and to be transported during a scanning operation. When the leading edge of a record sheet 80 has moved through 360 degrees, it engages the sensing lever arm 127 and, moving further, assumes the position shown in FIG. 4 in which the sensing arm 127 is raised by the record sheet 80 to the position illustrated in FIG. 4. In this position, the stop arm 130 projects through cutout 125 and blocks the guideway so that no record sheet can be fed into inlets 57, 58. In this manner, accidental feeding of a copy sheet to the rotary member 25 is prevented as long as a record sheet is being scanned by the record head 44, 44*a*.

When the scanning operation has been completed, closure member 61 opened, and the record sheet 80 discharged, the sensing lever arms 127 will drop into the groove 131 under the action of spring 128, so that the stop lever arms 130 are retracted from the guideway through which another record sheet may now be fed.

It will be understood that each of the elements described above, or two or more together, may also find a useful application in other types of apparatus for feeding sheets differing from the types described above.

While the invention has been illustrated and described as embodied in a feed control apparatus preventing feeding of a record sheet while another record sheet is being scanned in a recording and reproducing machine, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An apparatus for controlling the feeding of sheets, comprising, in combination, a rotary member for transporting a sheet wrapped around the peripheral surface thereof; feeding means for successively feeding sheets to said rotary member including a guide portion located adjacent said peripheral surface of said rotary member; a combined sensing and stop element including stop means located adjacent said member and movable between an inoperative position permitting passage of a sheet to said peripheral surface of said rotary member and a blocking position located in the region of said guide portion for blocking passage of sheets to said rotary member, and a sensing means fixedly connected to said stop means and tending to move with the same to a first position engaging said peripheral surface of said rotary member, and assuming a second position when engaging a transported sheet located on said peripheral surface, said sensing means holding said stop means in said inoperative position while said sensing means is in said first position, and holding said stop means in said blocking position while said sensing means is in said second position engaging a sheet transported by said rotary member whereby feeding of sheets to said rotary member is prevented only while a sheet transported by said rotary member is located in the region of said sensing means whereas a record sheet can pass along said guide portion when no sheet is transported by said rotary member.

2. In a recording and reproducing machine, in combination, a rotary member for transporting a record sheet wrapped around the peripheral surface thereof, said peripheral surface including a surface portion for engaging the record sheet and an annular groove adapted to be covered by a record sheet transported by said rotary member; feeding means for successively feeding record sheets to said rotary member and including a guide portion located adjacent said peripheral surface of said rotary member, said guide portion including an upper wall and a lower wall forming a guideway for guiding record sheets to said rotary member, said upper and lower walls having, respectively, opposite cutouts; a combined sensing and stop element including stop means located adjacent said member and movable between an inoperative position permitting passage of a record sheet to said peripheral surface of said rotary member and a blocking position located in said cutouts of said upper and lower walls of said guide portion for blocking passage of record sheets through said guideway to said rotary member, and a sensing means fixedly connected to said stop means and tending to move with the same to a first position located in said groove of said peripheral surface of said rotary member, and assuming a second position when engaging a transported record sheet located on said surface portion of said peripheral surface and covering said groove, said sensing means holding said stop means in said inoperative position while said sensing means is in said first position, and holding said stop means in said blocking position while said sensing means is in said second position engaging a record sheet transported by said rotary member whereby feeding of record sheets through said guideway to said rotary member is prevented only while a portion of a record sheet transported by said rotary member is located in the region of said sensing means whereas a record sheet can pass along said guide portion when no sheet is transported by said rotary member.

3. In a recording and reproducing machine, in combination, a rotary member for transporting a record sheet wrapped around the peripheral surface thereof; said peripheral surface including a surface portion for engaging the record sheet and an annular groove adapted to be covered by a record sheet transported by said rotary member; feeding means for successively feeding record sheets to said rotary member and including a guide portion located adjacent said peripheral surface of said rotary member, said guide portion including an upper wall and lower wall forming a guideway for guiding record sheets to said rotary member, said upper and lower walls having, respectively, opposite cutouts; an angular lever movably mounted adjacent said rotary member and including a first lever arm and a second lever arm, said lever being turnable between a first position in which said first lever arm is in an inoperative position retracted from said guide portion and permitting passage of a record sheet to said peripheral surface of said rotary member and in which said second lever arm is located in said annular groove of said peripheral surface of said rotary member, and a second position in which said first lever arm is in a blocking position located in said cutouts in said upper and lower walls of said guide portion for blocking passage of record sheets to said rotary member and in which said second lever arm is adapted to engage a record sheet located on said surface portion of said peripheral surface and covering said groove so that said first lever arm is held in said blocking position while said second lever arm engages a record sheet transported by said rotary member; and biasing means acting on said lever for turning the same into said first position so that said lever is turned to said second position by a transported record sheet whereby feeding of record sheets through said guideway to said rotary member is prevented by said first lever arm only while a portion of a record sheet transported by said rotary member is located in the region of said second lever arm and engaged by the same whereas a record sheet can pass along said guide portion when no sheet is transported by said rotary member.

4. An apparatus as set forth in claim 3 wherein said rotary member is a cylindrical drum; and including a pair of stationary end walls at opposite ends of said rotary drum; said upper and lower walls of said guide portion of said feeding means being located between said end walls; a shaft extending between said end walls and supporting said angular lever for turning movement, and a coil spring mounted on said shaft and connected to said angular lever and constituting said biasing means.

References Cited in the file of this patent

UNITED STATES PATENTS

| | | |
|---|---|---|
| 998,663 | Wood | July 25, 1911 |
| 2,394,577 | Wise | Feb. 12, 1946 |